(12) United States Patent
Yagi

(10) Patent No.: US 8,365,012 B2
(45) Date of Patent: Jan. 29, 2013

(54) ARRANGEMENTS DETECTING RESET PCI EXPRESS BUS IN PCI EXPRESS PATH, AND DISABLING USE OF PCI EXPRESS DEVICE

(75) Inventor: Nobuo Yagi, Upland, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/371,608

(22) Filed: Feb. 13, 2012

(65) Prior Publication Data

US 2012/0144231 A1 Jun. 7, 2012

Related U.S. Application Data

(63) Continuation of application No. 12/685,760, filed on Jan. 12, 2010, now Pat. No. 8,122,285.

(30) Foreign Application Priority Data

Mar. 26, 2009 (JP) ................................. 2009-076274

(51) Int. Cl.
*G06F 11/00* (2006.01)
*G06F 11/16* (2006.01)
(52) U.S. Cl. .............................. 714/4.5; 714/5.1; 714/43
(58) Field of Classification Search ................ 714/2, 4.5, 714/5.1, 43; 370/242, 248
See application file for complete search history.

(56) References Cited

U.S. PATENT DOCUMENTS

| 6,523,140 | B1 | 2/2003 | Arndt et al. | |
| 7,447,934 | B2 * | 11/2008 | Dasari et al. | 714/5.11 |
| 7,496,045 | B2 | 2/2009 | Boyd et al. | |
| 7,574,551 | B2 | 8/2009 | Gundam et al. | |
| 7,774,638 | B1 | 8/2010 | Cavanagh et al. | |
| 8,046,520 | B2 * | 10/2011 | Baba et al. | 710/316 |
| 2002/0184576 | A1 | 12/2002 | Arndt et al. | |
| 2007/0233821 | A1 | 10/2007 | Sullivan et al. | |
| 2007/0234118 | A1 * | 10/2007 | Sardella et al. | 714/23 |
| 2007/0240018 | A1 | 10/2007 | Nalawadi et al. | |
| 2008/0005372 | A1 * | 1/2008 | Bolen et al. | 710/8 |
| 2008/0016405 | A1 | 1/2008 | Kitahara | |
| 2008/0222449 | A1 * | 9/2008 | Ramgarajan et al. | 714/6 |
| 2008/0256400 | A1 | 10/2008 | Yang et al. | |
| 2009/0106470 | A1 | 4/2009 | Sharma et al. | |
| 2009/0276551 | A1 | 11/2009 | Brown et al. | |

FOREIGN PATENT DOCUMENTS

JP 2004-348335 12/2004
JP 2005-196351 7/2005

* cited by examiner

*Primary Examiner* — Joseph Schell
(74) *Attorney, Agent, or Firm* — Antonelli, Terry, Stout & Kraus, LLP.

(57) ABSTRACT

A root port connection functioning as a PCI express bridge, and having a PCI express path constituting a PCI express tree having a PCI express device or switch; when detecting a failure on a PCI express path, a PCI express device or switch transmits a failure signal; the root port transmits an SMI responsive to the failure signal; the CPU executes the BIOS responsive to the SMI; the BIOS collects a log of the PCI express path where failure is detected, analyzes the collected log to judge failure type, and upon a fatal failure on the PCI express path, resets the PCI express tree downstream of the root port that received the failure signal, and upon a non-fatal failure on the PCI express path, resets the PCI express device in which the failure occurred; and the CPU closes the reset PCI express device by executing the device driver.

15 Claims, 3 Drawing Sheets

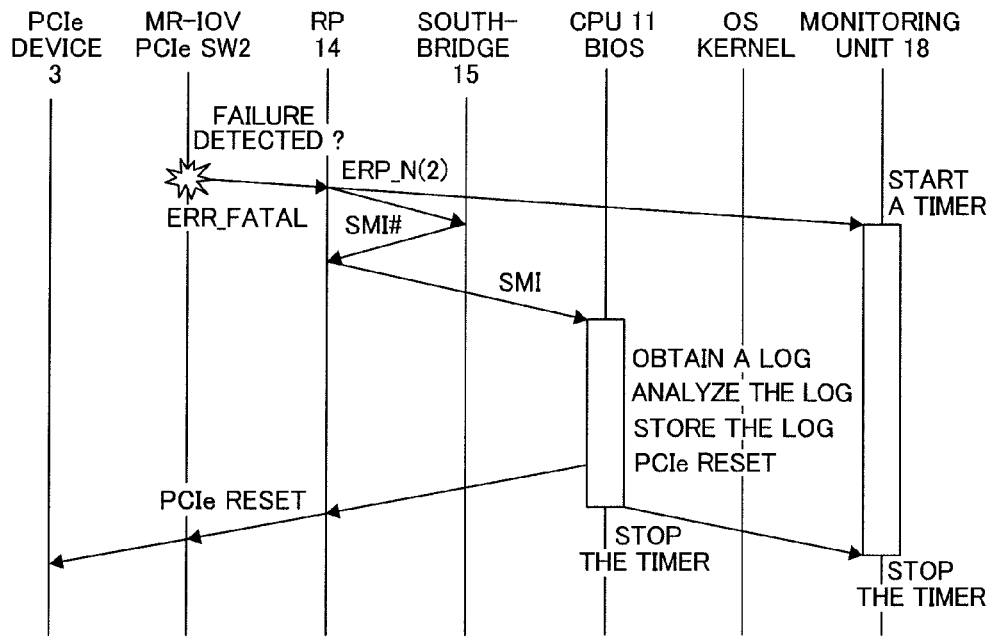
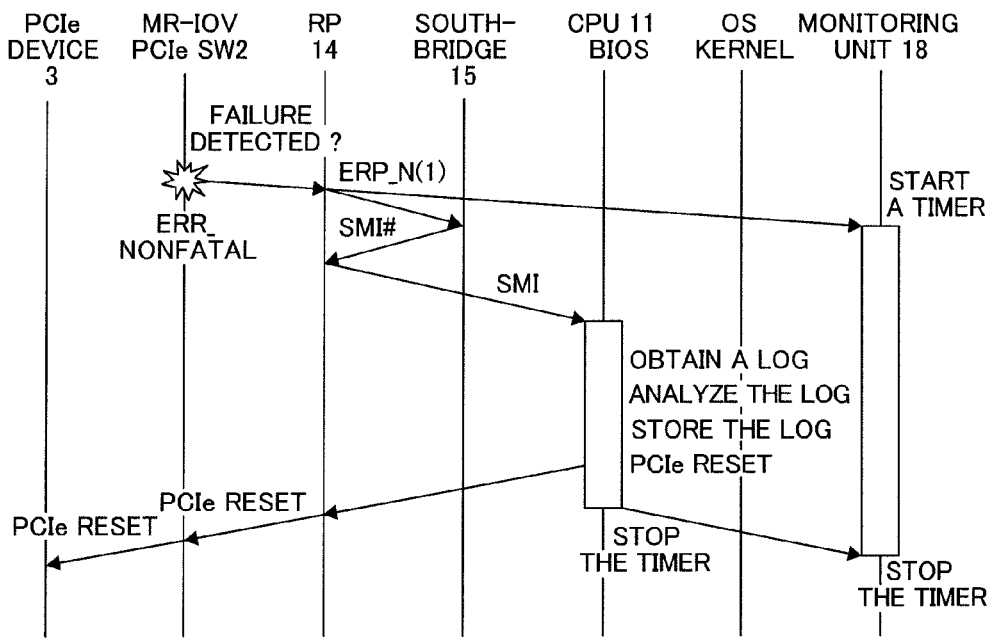

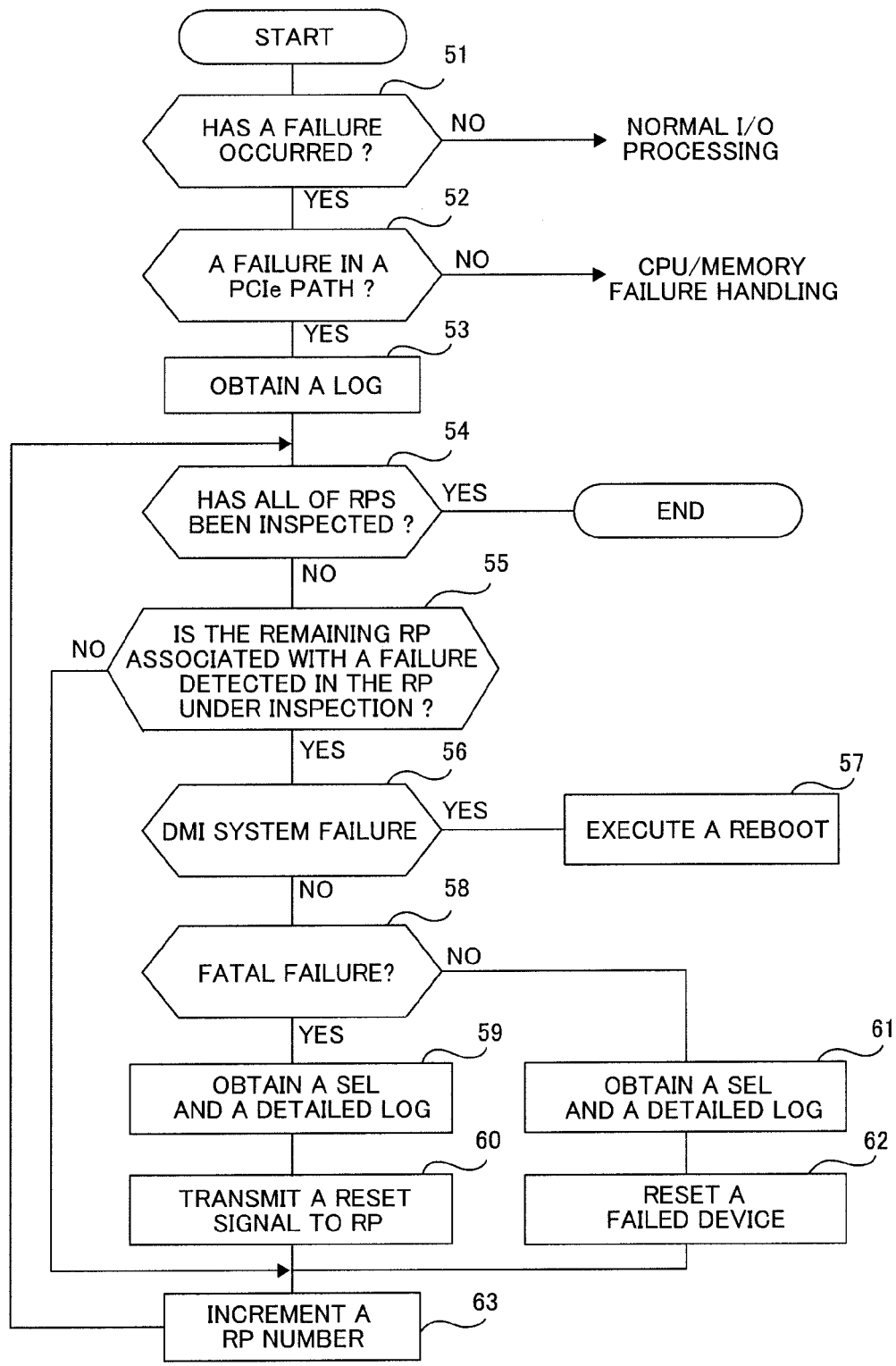

US 8,365,012 B2

ARRANGEMENTS DETECTING RESET PCI EXPRESS BUS IN PCI EXPRESS PATH, AND DISABLING USE OF PCI EXPRESS DEVICE

CROSS REFERENCE TO RELATED APPLICATION

This is a continuation of U.S. application Ser. No. 12/685,760, filed Jan. 12, 2010 now U.S. Pat. No. 8,122,285. This application relates to and claims priority from Japanese Patent Application No. 2009-076274, filed on Mar. 26, 2009. The entirety of the contents and subject matter of all of the above is incorporated herein by reference.

BACKGROUND OF THE INVENTION

1. Field of the Invention

The present invention relates to electronic computers, and more particularly to computers which detect and handle a failure that may occur on a PCI express path.

2. Description of the Related Art

A typical computer system having a PCI express path includes a root port that functions as a PCI express bridge (hereinafter, PCI Express is abbreviated to "PCIe"). The root port is connected to a CPU through a primary bus, and is connected to a PCI express path through a secondary bus. The PCIe path forms a PCIe tree that includes a PCIe switch and a PCIe device which each are connected to the corresponding root port.

A failure which has occurred in the PCIe device is notified to the root port through downstream and upstream ports of the PCIe switch. The root port notifies the CPU of this failure by interrupting the CPU through the primary bus. A failure on another PCIe path including a PCIe switch is notified to the root port through a PCIe switch in which the failure has been detected, or through a higher level PCIe switch connected to the PCIe switch.

Incidentally, such techniques as described above are disclosed by JP-A-2004-348335 and JP-A-2005-196351 for example.

SUMMARY OF THE INVENTION

Heretofore, when a failure occurs on a PCIe path as described above and a CPU is then subject to interruption based on notification created in response to such a failure, the CPU has no choice but to reset a system so as to reboot the operating system. In particular, a computer system includes a PCIe switch, and a plurality of computers, each of which is connected to each of upstream ports of the PCIe switch. Such a computer system has a problem that if a PCIe device shared by the plurality of computers goes down, then the whole computer system will go down. This means that the risk of system-down increases with the increase in the number of PCIe devices.

An object of the present invention is to disable only the use of the PCIe path on which a failure has occurred to thereby avoid resetting a system.

According to one aspect of the present invention, there is provided a computer comprising: a root port for detecting a failure on a PCIe path, and then for issuing a SMI (System Maintenance Interrupt) to a CPU; and the CPU for, on the receipt of the SMI, executing BIOS to issue, through the root port, a PCIe reset to the PCIe path on which the failure has occurred.

According to the present invention, because only the use of the PCIe path on which a failure has occurred is disabled, system reset can be avoided.

BRIEF DESCRIPTION OF THE DRAWINGS

FIG. 2 is a diagram illustrating operation steps of individual mechanisms to be taken when a fatal failure is detected on a PCIe path;

FIG. 3 is a diagram illustrating operation steps of individual mechanisms to be taken when a non-fatal failure is detected on the PCIe path; and FIG. 4 is a flowchart illustrating processing steps of a SMI handler of BIOS.

DESCRIPTION OF THE PREFERRED EMBODIMENTS

Figure 1:
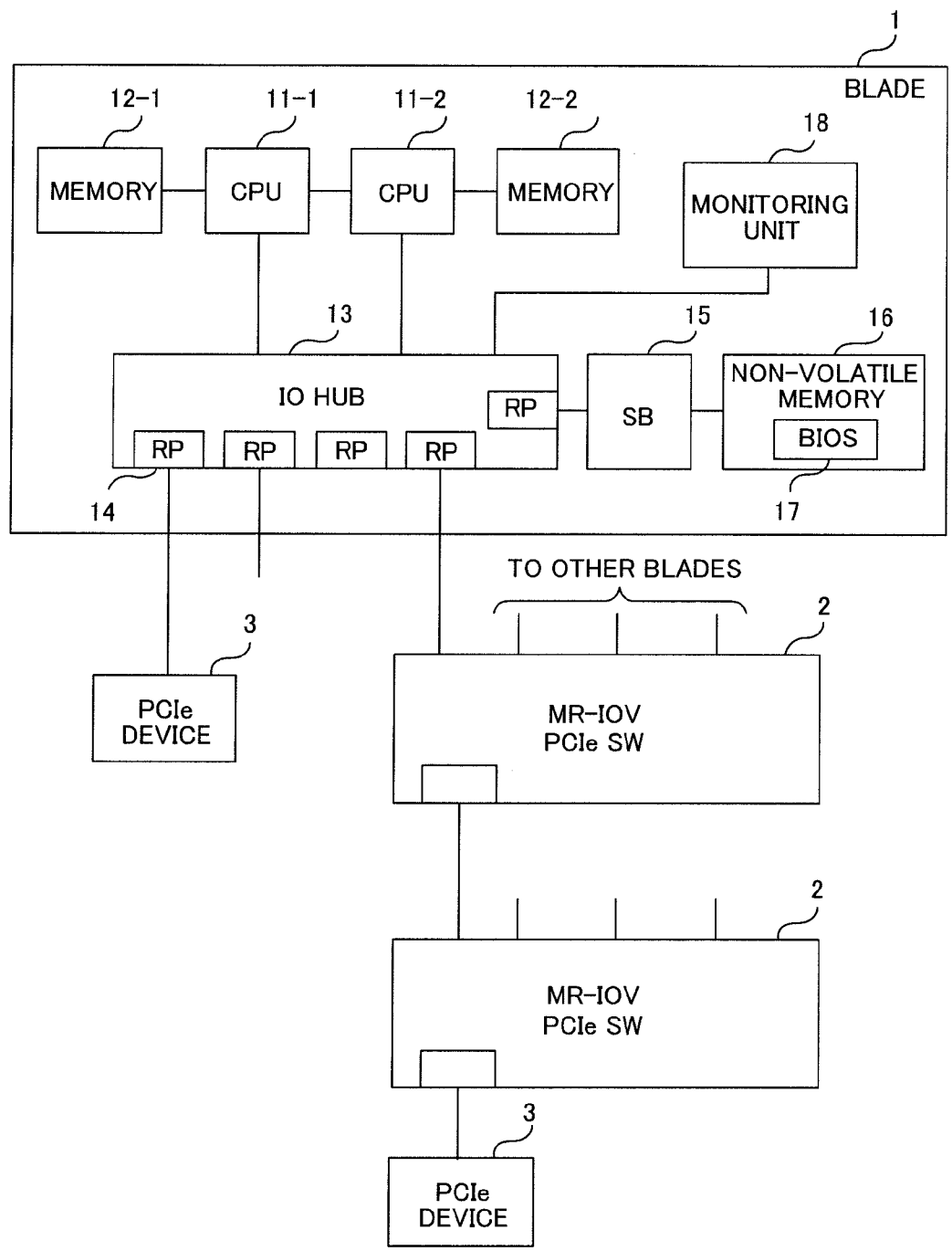
FIG. 1 is a diagram illustrating a configuration of a computer system according to this embodiment.

Embodiments of the present invention will be described below with reference to the accompanying drawings.

FIG. 1 is a diagram illustrating a configuration of a computer system according to this embodiment. The computer system includes at least one blade 1, multi-root IO virtualization PCIe switches (MR-IOV PCIe SW) 2, and PCIe devices 3. One blade 1 corresponds to one computer.

The blade 1 includes CPUs 11-1, 11-2, memories 12-1, 12-2, an IO hub 13, a Southbridge 15, a non-volatile memory 16, and a monitoring unit 18.

The IO hub 13 is connected to the CPUs 11-1, 11-2. The IO hub 13 is also connected to the MR-IOV PCIe SW 2 or the PCIe device 3 through RPs (Root Port) 14 that each function as a PCIe bridge. The RPs 14 are configured to be connected to the CPU 11 through a primary bus. In addition, a lower route for the RPs 14 is associated with a PCIe path connected through a secondary bus. The Southbridge 15 is connected to the IO hub 13 through a 0-th RP 14 of the IO hub 13 and a DMI (Direct Media Interface). The non-volatile memory 16 is connected to the Southbridge 15. The non-volatile memory 16 stores a BIOS (Basic Input Output System) 17. The monitoring unit 18 is connected to the IO hub 13 and monitors possible failures in the CPUs 11-1, 11-2 and an I/O.

An operating system (OS) is loaded into the memories 12-1, 12-2, and is then executed by the CPUs 11-1, 11-2. The BIOS 17 is copied to the memory 12-1, and is then executed by the CPUs 11-1, 11-2.

The MR-IOV PCIe SW 2 is connected to the specific RP 14 in the blade 1 through an upstream port of the MR-IOV PCIe SW 2. The MR-IOV PCIe SW 2 is also connected to another MR-IOV PCIe SW 2 or another PCIe device 3 through a downstream port thereof. Blades 1 different from each other can be connected to the upstream ports provided for each of the MR-IOV PCIe SWs 2.

FIG. 2 is a diagram illustrating operation steps of individual mechanisms to be taken when the MR-IOV PCIe SW 2 detects a fatal failure on the PCIe path. If the MR-IOV PCIe SW 2 detects a failure, then the RP 14 which is connected to the MR-IOV PCIe SW 2 is notified of the failure. The RP 14 transmits a signal indicating the fatal failure to both the Southbridge 15 and the monitoring unit 18 through an ERR_N(2) pin. On the receipt of this signal, the monitoring unit 18 starts a timer. When the Southbridge 15 transmits a signal to prompt a SMI (System Maintenance Interrupt) to the RP 14 through a SMI# pin, the RP 14 uses the SMI to notify the CPU 11 of the failure that has occurred on the PCIe path. When the CPU 11 receives this interrupt, the control is passed to the BIOS in the memory 12. The BIOS obtains a log of, for example, a computing element included in the CPU 11, and also obtains a log of elements outside the CPU 11. The BIOS then analyzes the obtained logs to categorize failures into groups, before storing the logs in a log recording area. The BIOS stores the logs in the non-volatile memory 16, or transmits them to the monitoring unit 18. In the case of a failure on the PCIe path, the BIOS transmits a PCIe reset signal through the RP 14 which is connected to the MR-IOV PCIe SW 2 that has detected the failure. Thus, a PCIe tree whose level is lower than the RP 14 that has detected the failure is reset. Next, the BIOS transmits a timer stop signal to the monitoring unit 18.

After the PCIe tree is reset, an OS device driver operates as follows. When a DMA termination interrupt or a DMA timeout is detected or when an IO access to the PCIe device 3 is made at the time of starting the IO access, the access to the PCIe device 3 which has been reset provides a Master Abort response. Based on such a response, the OS device driver judges that the PCIe device 3 under control cannot be used, and accordingly, the device driver disables the use of the PCIe device 3. If the system has a redundant configuration to cope with a failed device, the system can continue the operation thereof.

FIG. 3 is a diagram illustrating operation steps of individual mechanisms to be taken when the MR-IOV PCIe SW 2 or the PCIe device 3 detects a non-fatal, non-recoverable failure on the PCIe path. If the MR-IOV PCIe SW 2 is involved in a failure, points of difference between the operation steps of a non-fatal, non-recoverable failure and those of a fatal failure are follows: the MR-IOV PCIe SW 2 notifies the RP 14 of a failure through an ERR_NONFATAL pin, and the RP 14 transmits a signal indicating the non-fatal, non-recoverable failure to both the Southbridge 15 and the monitoring unit 18 through an ERR_N(1) pin. In addition, the BIOS transmits a secondary bus reset signal to a failed device through the MR-IOV PCIe SW 2 that has detected the failure. The BIOS transmits a PCIe reset signal directly to the failed PCIe device 3 in such a configuration that the PCIe device 3 is directly connected to the RP 14 of the IO hub 13. The device driver detects the failed device, and disables the use of the failed device, in the same manner as the operation steps taken when the fatal failure occurs.

FIG. 4 is a flowchart illustrating processing steps of a SMI handler of the BIOS. The SMI handler of the BIOS is started up in response to a SMI. Next, the SMI handler judges whether or not a failure has occurred (step 51). The BIOS reads a failure report register, which is included in the CPU or the IO hub, to judge whether or not a PCIe path has failed (step 52). If it is judged that the PCIe path has failed, the BIOS obtains a general log for the failed PCIe path (step 53). If all the RPs 14 in the IO hub 13 have not been inspected (step 54, NO), the BIOS judges whether or not the remaining RP 14 is associated with a failure that has been detected in the RP under inspection (step 55). If the remaining RP 14 is not judged to be associated with a failure that has been detected in the RP under inspection, the process executed by the BIOS proceeds to a step 63. If the remaining RP 14 is judged to be associated with a failure that has been detected in the RP under inspection, then the BIOS judges whether or not a DMI system has failed (step 56). If it is judged that the DMI system has failed, the process executed by the BIOS proceeds to a reboot step (step 57).

If it is not judged that the DMI system has failed, then the BIOS judges whether or not the interrupt has been executed based on a fatal failure (in other words, the BIOS judges whether or not this failure is a fatal failure) (step 58). If it is judged that the interrupt has been executed based on a fatal failure, the BIOS obtains a SEL (System Event Log) and a detailed log (step 59), and then issues a reset signal to a PCIe tree whose level is lower than the RP 14 in question (step 60). After that, the process proceeds to a step 63. If it is not judged that the interrupt has been executed based on a fatal failure, the BIOS obtains the SEL and the detailed log (step 61), and then issues a reset signal to the failed device (step 62). After the processing of the step 55, 60 or 62 ends, the BIOS increments a RP number by one (step 63), before the process returns to the step 54. If the inspection of all of the RPs 14 of the IO hub 13 has been finished (step 54, YES), the BIOS ends the processing of the SMI handler.

The operation steps and processing steps described above are applied also to a computer system including a plurality of blades 1 in a similar manner. In such a computer system, the RPs 14 of all the blades 1 that are connected to the PCIe path are notified of a failure occurring on the PCIe path. Each of the RPs 14 issues a SMI to the CPU 11 that is connected through a primary bus. Each of the CPUs 11 receives this SMI, and executes the BIOS according to the processing steps so as to reset the failed PCIe path. Each of the CPUs 11 executes a device driver in the memory 12 so as to disable the use of the PCIe device in the failed PCIe path. Therefore, although the failed PCIe path, which is shared by the plurality of blades 1, is disabled, the other PCIe paths can operate continuously.

The present invention is a method including the steps of: calling a BIOS in response to a SMI; allowing the BIOS to detect a failure on a PCIe path; resetting a PCIe tree or a PCIe device which has been detected; and allowing a device driver to indirectly detect a failed device and to disable the use of the failed device. In contrast, there is known a method in which a MSI (Message Signal Interrupt) is applied to call a device driver, and the device driver directly detects a failure on a PCIe path and recovers the failure. However, the SMI is advantageous in that the SMI has a higher priority of interrupt acceptance than the MSI. Moreover, because the MSI is a memory write message, the MSI is applied only to a specific CPU 11, and the device driver disadvantageously executes processing more slowly than the BIOS. The method according to the present invention has advantages that, in comparison with the method in which a device driver detects a failure on a PCIe path, it is possible to achieve a desired object without modifying OS and the device driver, and that the speed of failure detection is higher.

What is claimed is:
1. A method of handling a failure in a computer, the computer comprising:
    a memory that stores a BIOS and a device driver for controlling a PCI express device;
    a CPU that executes the BIOS and the device driver; and
    a root port connected to the CPU through a primary bus and to a PCI express path through a secondary bus, the root port functioning as a PCI express bridge;
    wherein:
    the PCI express path constitutes a PCI express tree having at least any one of the PCI express device and a PCI express switch;
    when detecting a failure on the PCI express path, the PCI express device or the PCI express switch transmits a signal indicating the failure to the root port;
    the root port transmits an SMI (System Maintenance Interrupt) to the CPU upon receipt of the signal indicating the failure;
    the CPU executes the BIOS, the BIOS being started in response to receipt of the SMI;

the BIOS: collects a log of the PCI express path on which the failure has been detected, and analyzes the collected log to judge the type of the failure, and when the failure is judged to be a fatal failure on the PCI express path by the judgment, resets the PCI express tree downstream of the root port that received the signal indicating the failure, and when the failure is judged to be a non-fatal failure on the PCI express path by the judgment, resets the PCI express device in which the failure occurred; and the CPU disables the reset PCI express device by executing the device driver.

2. The method of handling a failure in a computer according to claim 1, wherein:

the memory storing the BIOS is connected to the root port through a first interface; and when the failure is judged to be a failure on the first interface by the judgment, the BIOS reboots an operating system which is executed by the CPU.

3. The method of handling a failure in a computer according to claim 2, wherein:

the BIOS reads at least any one of failure report registers in the CPU and failure report registers in an IO hub having the root port and judges whether or not the failure is a failure on the PCI express path; and when the failure is judged to be a failure on the PCI express path, the BIOS collects the log of the PCI express path on which the failure has been detected.

4. The method of handling a failure in a computer according to claim 3, wherein the BIOS stores the collected log in a monitoring unit connected to the IO hub or in the memory.

5. A computer comprising:

a memory that stores a BIOS and a device driver for controlling a PCI express device;

a CPU that executes the BIOS and the device driver; and a root port connected to the CPU through a primary bus and to a PCI express path through a secondary bus, the root port functioning as a PCI express bridge;

wherein:

the PCI express path constitutes a PCI express tree having at least any one of the PCI express device and a PCI express switch;

when detecting a failure on the PCI express path, the PCI express device or the PCI express switch transmits a signal indicating the failure to the root port;

the root port transmits an SMI (System Maintenance Interrupt) to the CPU upon receipt of the signal indicating the failure;

the CPU executes the BIOS, the BIOS being started in response to receipt of the SMI;

the BIOS: collects a log of the PCI express path on which the failure has been detected, and analyzes the collected log to judge the type of the failure, and when the failure is judged to be a fatal failure on the PCI express path by the judgment, resets the PCI express tree downstream of the root port that received the signal indicating the failure, and when the failure is judged to be a non-fatal failure on the PCI express path by the judgment, resets the PCI express device in which the failure occurred; and the CPU disables the reset PCI express device by executing the device driver.

6. The computer according to claim 5, wherein:
the memory storing the BIOS is connected to the root port through a first interface; and when the failure is judged to be a failure on the first interface by the judgment, the BIOS reboots an operating system which is executed by the CPU.

7. The computer according to claim 6, wherein:

the BIOS reads at least any one of failure report registers in the CPU and failure report registers in an IO hub having the root port, and judges whether or not the failure is a failure on the PCI express path; and when the failure is judged to be a failure on the PCI express path, the BIOS collects the log of the PCI express path on which the failure has been detected.

8. The computer according to claim 7, wherein the BIOS stores the collected log in a monitoring unit connected to the IO hub or in the memory.

9. The computer according to claim 8, wherein the first interface is a Direct Media Interface.

10. A computer system comprising:

a plurality of computers, each of the computers including a memory that stores a BIOS and a device driver for controlling a PCI express device; a CPU that executes the BIOS and the device driver; and a root port connected to the CPU through a primary bus and to a PCI express path through a secondary bus, the root port functioning as a PCI express bridge; and the PCI express device and a PCI express switch that constitutes the PCI express path;

wherein:

when a failure on the PCI express path is detected, the PCI express device or the PCI express switch transmits a signal indicating the failure to the root port;

the root port, upon receipt of the signal indicating the failure, transmits a signal indicating the failure to the root port of the computer connected to the PCI express path;

the root port that received the signal indicating the failure transmits an SMI (System Maintenance Interrupt) to the CPU connected through the primary bus;

the CPU executes the BIOS, the BIOS being started in response to receipt of the SMI;

the BIOS: collects a log of the PCI express path on which the failure has been detected, and analyzes the collected log to judge the type of the failure, and when the failure is judged to be a fatal failure on the PCI express path by the judgment, resets the PCI express tree downstream of the root port that received the signal indicating the failure, and when the failure is judged to be a non-fatal failure on the PCI express path by the judgment, resets the PCI express device in which the failure occurred; and the CPU disables the reset PCI express device by executing the device driver.

11. The computer system according to claim 10, wherein:
the memory storing the BIOS is connected to the root port through a first interface; and when the failure is judged to be a failure on the first interface by the judgment, the BIOS reboots an operating system which is executed by the CPU.

12. The computer system according to claim 11, wherein:
the BIOS reads at least any one of failure report registers in the CPU and failure report registers in an IO hub having the root port, and judges whether or not the failure is a failure on the PCI express path; and when the failure is judged to be a failure on the PCI express path, the BIOS collects the log of the PCI express path on which the failure has been detected.

13. The computer system according to claim 12, wherein the BIOS stores the collected log in a monitoring unit connected to the IO hub or in the memory.

14. The computer system according to claim 13, wherein the first interface is a Direct Media Interface.

15. The computer system according to claim 14, wherein the computer is a server blade.

* * * * *